US009483729B1

(12) United States Patent
Allen et al.

(10) Patent No.: US 9,483,729 B1
(45) Date of Patent: Nov. 1, 2016

(54) MINING GROUP PATTERNS IN DYNAMIC RELATIONAL DATA VIA INDIVIDUAL EVENT MONITORING

(75) Inventors: David L. Allen, Thousand Oaks, CA (US); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 260 days.

(21) Appl. No.: 13/600,101

(22) Filed: Aug. 30, 2012

(51) Int. Cl.
 *G06N 5/02* (2006.01)
(52) U.S. Cl.
 CPC ...................................... *G06N 5/02* (2013.01)
(58) Field of Classification Search
 None
 See application file for complete search history.

(56) References Cited

PUBLICATIONS

Lo, CyborGlogger: A Computational Framework for Real-time CyborGlogging, Masters Thesis, University of Toronto, Jul. 27, 2010, pp. 1-91.*
Niu, et al., Performances and characteristics of DIGRank, ranking in the incomplete networks, 2011 11th IEEE International Conference on Data Mining, 2011, pp. 1182-1187.*
Bosnjak, et al., TwitterEcho—A Distributed Focused Crawler to Support Open Research with Twitter Data, WWW '12 Companion Proceedings of the 21st International Conference on World Wide Web, Apr. 16-20, 2012, pp. 1233-1239.*
Vespignani, Allessandro, Soma Sanyal, and Katy Borner. "Network Science." In Annual Review of Information Science and Technology 41, 537-607, 2007.
Chakrabarti, Deepayan and Christos Faloutsos. "Graph Mining: Laws, Generators, and Algorithms." In ACM Computing Surveys, vol. 38, No. 1, Mar. 2006.
Zhou, Ying, and Joseph Davis. "Discovering Web Communities in the Blogspace." In Proceedings of the 40th Hawaii International Conference on Systems Sciences, 2007.
Flake, Gary, Steve Lawrence, Lee Giles, and Frans Coetzee. "Self-Organization and Identification of Web Communities." In Computer, 2002.
V. Batagelj and A. Mrvar in "Pajek—Analysis and Visualization of Large Networks," in Juenger, M., Mutzel, P. (Eds.): Graph Drawing Software, Springer (series Mathematics and Visualization), Berlin 2003, 77-103.
V. Batagelj and A. Mrvar in "Pajek—Program for Large Network Analysis in Connections," 21(1998)2, 47-57.
Skye Bender-deMoll and McFarland, Daniel A. "The Art and Science of Dynamic Network Visualization" in Journal of Social Structure, vol. 7, No. 2, 2006.

* cited by examiner

*Primary Examiner* — Wilbert L Starks
(74) *Attorney, Agent, or Firm* — Tope-McKay & Associates

(57) ABSTRACT

Described is a system for detecting group behaviors in dynamic relational data by monitoring individual events of interest. Data is collected from a domain of interest at predetermined time intervals. Examples of domains of interest include internet data, video behavior analysis, social networks, and diagnosis and prognosis. The data is then monitored for at least one local event of interest defined by a user. The system is configured to analyze a relationship between at least two monitored local events of interest. Finally, a visual representation of the relationship between the monitored local events of interest is generated and presented to the user for further analysis. Also described is a method and computer program product for detecting group behaviors in data.

18 Claims, 7 Drawing Sheets

MINING GROUP PATTERNS IN DYNAMIC RELATIONAL DATA VIA INDIVIDUAL EVENT MONITORING

BACKGROUND OF THE INVENTION (1) Field of Invention

The present invention relates to a system for detecting group behaviors in data, and more particularly, to a system for detecting group behaviors in data by monitoring individual behaviors for events of interest.

(2) Description of Related Art

Data mining is the process of extracting patterns from data. Presently, data is being collected at a rate that can no longer be manually analyzed. Therefore, there is a strong need to automate the knowledge extraction and processing tasks. Existing data mining and knowledge discovery from data (KDD) algorithms have begun to address these needs; however, existing techniques are not effective with data from dynamically evolving relational domains. With current techniques, it is very difficult to detect and monitor group behaviors from data, such as when a group of individuals collude, or work in unison, together. Two major limiting factors are the quantity of information required for the detection of group behaviors and the relationships involved.

In a survey paper of the interdisciplinary field of network science, Vespignani et al. describe different types of networks, such as (un)directed and (non)weighted networks, as well as issues such as node and edge properties in "Network Science" in the Annual Review of Information Science and Technology 41, 537-607, 2007. Vespignani et al. is hereby incorporated by reference as though fully set forth herein. The authors briefly discuss methods for sampling large datasets where the entire dataset cannot be observed at the same time. The paper also presents some methods for modeling dynamic networks and for network visualization.

Additionally, Chakrabarti et al. analyze properties of real-world graphs and discuss methods for generating graphs with similar properties (e.g., power laws, small diameters, community effects) in "Graph Mining: Laws, Generators, and Algorithms" in Association for Computing Machinery (ACM) Computing Surveys, Vol. 38, No. 1, March 2006. Chakrabarti et alt is hereby incorporated by reference as though fully set forth herein. A problem related to this paper is that of detecting abnormalities (e.g., outliers) in a graph.

Zhou et al. present methods for identifying communities within weblogs with common interests in "Discovering Web Communities in the Blogspace" in Proceedings of the 40$^{th}$ Hawaii International Conference on Systems Sciences, 2007. Zhou et al. is hereby incorporated by reference as though fully set forth herein. The authors define a community as a group of blogs that have a high density of edges within them and a low density of edges between groups. The problem of community identification is related to collusion, however, there are differences in that there may be communities which are not colluding together or there may be a large community where only a small number of members are involved in the collusion. In their analysis, Zhou et al. also require a "full picture" of the network of interest and the relationships between them.

Finally, Flake et al. analyze Internet data to model self-organization and community identification in "Self-Organization and Identification of Web Communities" in Computer, 2002. Flake et al. is hereby incorporated by reference as though fully set forth herein. Their work focuses on links between websites, rather than weblogs and it detects the communities by assuming one or more seed Web sites and then recasts the problem as a maximum flow problem, making the community identification problem tractable.

The prior art described above deals with searching, community formation/classification, and epidemics (i.e., disease or information spreading). Thus, a continuing need exists for a system which makes it possible to identify group patterns in data through monitoring of individual events. The invention described herein provides a system that allows analysis of data from dynamically evolving relational domains.

SUMMARY OF THE INVENTION

The present invention relates to a system for detecting group behaviors in data. The system comprises one or more processors configured to perform operations of collecting a set of data from a domain of interest at predetermined time intervals, which is then stored in a storage mechanism. The system monitors at least one local event of interest in the set of data, wherein the at least one local event of interest is at a level of an individual user and the individual user's direct relationships. The system then analyzes a relationship between at least two monitored local events of interest with an analysis engine. Finally, the system generates, with the analysis engine, visual results representing the relationship between the at least two monitored local events of interest for presentation to the individual user.

In another aspect, the at least one local event of interest is defined by the individual user.

In another aspect, the domain of interest is a dynamically evolving relational network.

In another aspect, the system is further configured to perform operations of
computing a set of properties of a relationship graph representing the relationship between the at least two monitored local events of interest; and exporting the relationship graph for presentation to the individual user.

In yet another aspect, the system is further configured to perform an operation of exporting dynamic data for presentation to the individual user, wherein the dynamic data depicts relationships between monitored local events of interest forming and leaving.

In another aspect, the act of monitoring of at least one local event of interest is performed in a distributed and parallel manner, such that a plurality of processors monitor the set of data simultaneously.

In another aspect, the system is further configured to calculate a change value within a set of data collected at different time intervals, such that the individual user can define a local event of interest based on the change value.

In another aspect, the dynamically evolving relational network is an Internet biog.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
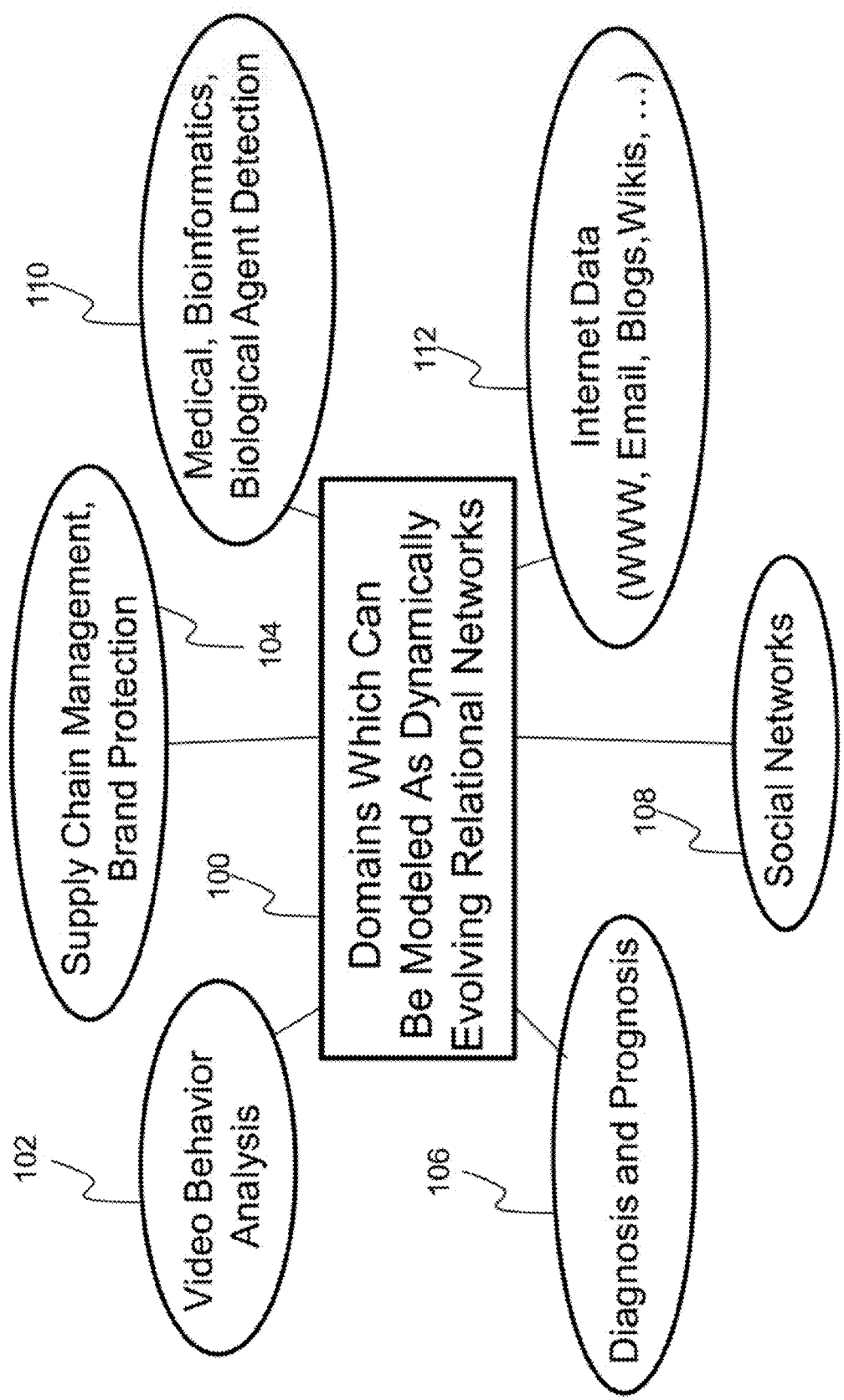
FIG. 1 illustrates example domains which can be modeled as dynamically evolving relational networks according to the present invention.

The present invention relates to a system for detecting group behaviors in data and, more particularly, to a system for detecting group behaviors in data by monitoring individual behaviors for events of interest. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for detecting group behaviors in data. The system is typically in the form of a computer system, computer component, or computer network operating software or in the form of a "hard-coded" instruction set.

This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for detecting group behaviors in data, typically in the form of software, operated using a data processing system (computer or computer network). The third principal aspect is a computer program product. The computer program product generally represents computer-readable instruction means stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a non-transitory computer-readable medium such as a floppy disk, a CD-ROM, and a flash drive. These aspects will be described in more detail below.

(2) Specific Details

The present invention provides a method, system, and computer program product for detecting group behaviors in data by monitoring individual behaviors for Events of Interest (EOI), and then analyzing the relationships between these events, rather than trying to analyze all existing relationships. When analyzing data originating from multiple entities (e.g., people, animals, parts, vehicles), it is very difficult to detect group behaviors. Analysis requires a significant amount of data and, frequently, the required computations become a limiting factor. A solution to this problem, presented herein, is to define local EOIs that can be detected quickly and efficiently. As will be discussed in detail below, techniques from social network analysis (e.g., visualizations as will be described below) and graph theory (e.g., node centrality, graph diameter, degree distribution) are then used to analyze the dynamic patterns between the local EOIs in order to detect possible instances of group behaviors.

The present invention overcomes the quantity of data by "filtering" down and decomposing a large dataset, which may not be able to be easily processed by a single computer. Once this is done, only local data needs to be analyzed. This can be thought of as filtering down huge quantities of data into much smaller sets of local EOIs, where the relationships can be more easily analyzed. The filtering drastically reduces the quantity of data and also allows the monitoring to be done in a distributed and parallel manner. Thus, many different computers can work simultaneously on small parts of the data, and no single computer needs all of the data at once. The local computations filter down the large quantities of data into a much smaller set of EOIs. These local events are then combined to detect and analyze global behaviors. In the process, some detection capability may be lost (e.g., not every group behavior will be able to be identified from the EOIs). However, it can be determined a priori which events can be identified via this technique, and the improved efficiency will make the computations tractable.

The present invention is suited for monitoring and analysis of dynamic relational data. A non-limiting example, which is presented in detail herein, is mining the domain of Internet blog data. However, the present invention also has applications in many other areas applicable to both commercial and government fields (e.g., defense, military). Non-limiting examples of commercial applications include monitoring information related to a company's supply chain and monitoring sites related to product service or customer opinion sites. Furthermore, the present application could also be used in analyzing relational data from products, such as warranty data. In this example, rather than collusion, it may be advantageous to look for inadvertent issues such as parts from a specific manufacturing plant that are more susceptible to failures than those from other plants.

FIG. 1 illustrates some non-limiting examples of domains which can be modeled as dynamically evolving relational networks 100. These domains include video behavior analysis 102; supply chain management and brand protection 104; diagnosis and prognosis 106; social networks 108; medical, bioinformatics, and biological agent detection 110; and internet data 112 (e.g., WWW, Email, Blogs, Wikis, friendships on blog sites, photograph tagging, and locations of twitters). Additional non-limiting examples of relational networks include power grids and traffic and road patterns.

Other applications where this methodology could be useful are social network analysis for Homeland Security applications (e.g., border protection), customer opinion monitoring, and warranty/service data. For example, in customer opinion monitoring, the events of interest might be monitoring specific websites, newspapers, or publications for increased (or decreased) postings related to a specific product, or for significant change of sentiment (e.g., many people suddenly rating the product low). By monitoring different sites, a user may be able to detect that a competitor or a disgruntled employee is going to many sites and adding reviews in order to hurt sales (e.g., maybe using various pseudonyms). In the domain of warranty and service data monitoring, the EOIs may be items such as how many service requests are being performed for specific parts in specific regions of the country. This type of analysis could then be used to detect relationships between part failures or used to detect counterfeit parts (e.g., different regions using atypical numbers of parts or significant change in numbers as the counterfeit ring grows).

The methodology described herein is based on modeling entities and their relationships as networks. The present application describes a specific embodiment using Internet blogging data. However, as can be appreciated by one skilled in the art, the present invention can be used for a variety of dynamically evolving relational networks, and is not limited to the example presented. Internet blogs frequently link to other blogs. For instance, blog authors often include links to other blogs they regularly read and other interesting articles they have found, or they leave links when they add comments. Many blogs also have financial motives for bringing people to their site or sending them to specific websites (e.g., advertising revenue). Therefore, one application of monitoring relationships between blogs is to monitor for blog authors which try to artificially drive up revenue by colluding with others to increase their popularity.

The approach described herein consists of four primary steps: data collection, temporal discretization, group pattern mining via individual events of interest, and visualizing results. For data collection, a download tool was developed for downloading data from LiveJournal.com, a popular Internet blogging website. More specifically, files known as Friend-of-A-Friend (FOAF) files were downloaded from the blogs. The FOAF files contain information about the blogger, such as names, nicknames, city and country of residence, and contact information. In regards to the present invention, the data of interest is links from this blogger to their immediate relationships. Immediate relationships include the blogger's interests and their friends (i.e., other bloggers on the site).

Files cannot be downloaded from every user, as there are millions of users on the site. Additionally, the focus is the dynamics of the relationships, and not simply a snapshot. Therefore, blogs of interest were identified, and the related FOAF files were downloaded at specific intervals. In this implementation, related FOAF files were downloaded approximately every two weeks. Attempting to perform the analysis directly from the individual FOAF files is not feasible, both from the perspective of easy access to the information and due to the size of the data and computational requirements for processing it. Therefore, a storage device (database) was built to store the pertinent information from the files, notably the changes from the previous download. Data was collected for a period of a few months to generate a database with over one million blogs, more than forty-three million friendships, and thirty-nine million interests.

Figure 2:
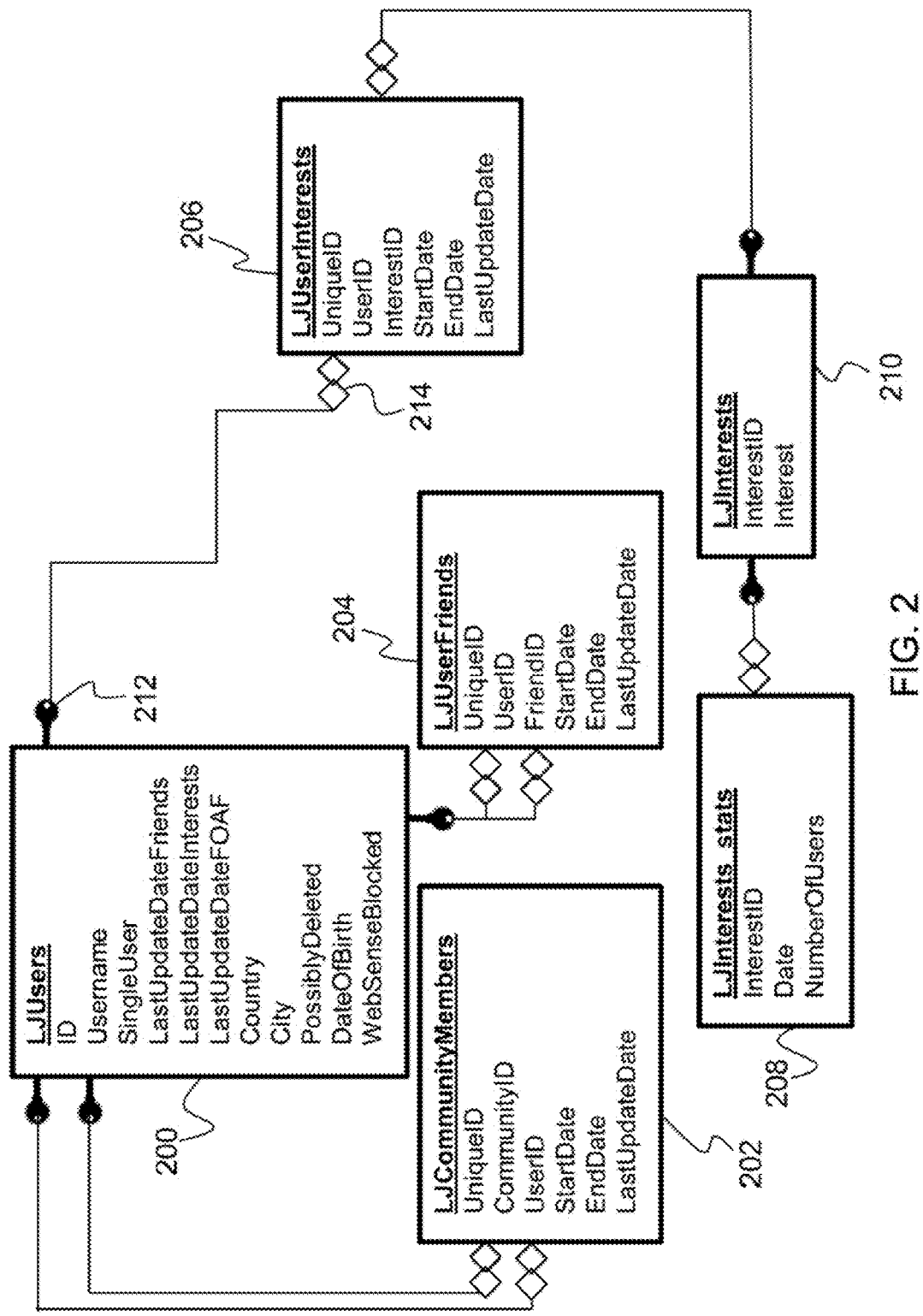
FIG. 2 is an example database schema for downloaded data according to the present invention.

The next step in the process is temporal discretization. The changes occurring in real-life happen as a continuous stream. However, due to the limited access to downloading the information, the real-data was sampled at specific intervals. For the described embodiment, FOAF were continually downloaded. However, a file for a specific blog was not downloaded more than once every two weeks. The download tool was then used to compare the newly downloaded file with the existing information in the database and add in additional changes. FIG. 2 illustrates the database schema for downloaded data, but other schemas or storage mechanisms could also be developed. The table LJUsers 200 ("LJ" refers to "LifeJournal.com") stores the personal information from the blog, including information such as the dates of the last update. Information about "events" was then stored in the other tables. These "events" could be joining or leaving a group (community), starting/lending a friendship, or starting/ending an interest. For each of these events, the StartDate (i.e., first download of the event) and the EndDate (i.e., when it is realized that the event is no longer in the file) were stored. The StartDate and EndDate information is contained in the tables LJCommunityMembers 202, LJUserFriends 204, and LJUserInterests 206. Additional tables include a LJInterests_stats 208 table, which includes information such as the number of users, and a LJInterests 210 table, which includes interests and interests IDs. Through this process, data is continually collected from the site. For each user, the data becomes discrete as the events occur throughout the two week interval; however, changes are only apparent at that discrete time point of the next download. Two symbols, a key symbol 212 and an infinity symbol 214, are used to represent "one-to-many" relationships between the tables. For example, the LJUsers 200 table contains an entry for each user and the LJUserInterests 206 table contains mappings between users and interests they have. Each user can have many interests. Therefore the user end has a key symbol. 212 representing one entry there. The infinity symbol 214 represents the fact that each user can have many interests.

In the next step of the process, group patterns are mined via individual EQIs. Group collusion can be very significant or even detrimental; however, it is also very difficult to detect. For instance, the Google™ search engine spends a significant effort trying to detect websites which collude to improve their PageRank™ score. In the presented example of blog data, bloggers could collude to improve their notoriety or their rankings to get more people to read their blogs. On some blog sites, bloggers receive money via advertising. Therefore, there is a direct financial incentive to attract others.

Detecting collusion or group patterns can be very difficult, especially if the users are attempting to do it covertly and covering up their efforts. It is also difficult because of the large volumes of data involved. In the system described herein, the user explicitly builds up individual EOIs which they are interested in monitoring, non-limiting examples of which include adding or removing a large quantity of interests or friends over a very short period of time. An example of such an event includes calculating the changes within a users group of friends. The following definitions were created:
(1) Additions_t=total number of new friends during time period t
(2) Removals_t=total number of friends removed during time period t
(3) Num_Friends=total number of friends at the end of time period t
(4) Total_change_t=Additions_t+Removals_t
(5) Percent_change_t=Total_change_t/Num_Friends*100

The EOIs can then be defined based on these values. For example, a user may want to monitor events where the Total_change_t>8 and the Percent_change_t>5. The definitions allow a user to filter down to only events where there was at least a 5% change in the social network user's friends. Additionally, a substantial amount of change can be identified. For instance, EOIs can be filtered such that there is no interest if the social network user changes from one friend to two friends, but there is interest if the user changes from thirty friends to fifty friends.

Furthermore, the data can be filtered by looking at only certain people in the dataset. For instance, a person of interest (POI) can be identified and then only EOIs related to that POI are analyzed. For example, a HopCount could be set to HopCount=2, which means that the system will only analyze the POI, their friends, and the friends of friends of the POI (i.e., people within 2 hops from the POI). A HopCount is the number of routers through which data must pass between source and destination. Each router along the data path constitutes a hop. Therefore, HopCount is a basic measurement of distance in a data network. The system then generates a new graph of only the people containing EOIs and their relationships. Additionally, relationships of interest can be defined. In the current implementation, the friendship relationship is used. However, as can be appreciated by one skilled in the art, one could define relationships to be people with similar interests or other people with at least n common friends, for instance. Note that the filtering occurs locally at the level of the individual user and their immediate relationships (e.g. friendships or interests). The local filtering can, however, detect actions such as a closely linked group splitting into two (i.e., the individuals remove those friendships with people in the other group) or two groups joining together (i.e., the individuals add many friends which were in the other group). Once a new relational graph is generated, the output is then analyzed for group or community identification and for visualization.

The system described herein also presents the analysis results to the user to allow the user to visualize the results. In the embodiment described herein, data is exported in formats such that existing tools can be used to visualize the results. As a non-limiting example, plots can be made to visualize relationships between a set of blogs and their author's interests through a tool called Pajek, a program for large network analysis. Pajek is described by V. Batagelj and A. Mrvar in "Pajek—Analysis and Visualization of Large Networks," in Juenger, M., Mutzel, P. (Eds.): Graph Drawing Software, Springer (series Mathematics and Visualization), Berlin 2003, 77-103 and by V. Batagelj and A. Mrvar in "Pajek—Program for Large Network Analysis in Connections," 21(1998)2, 47-57, which are hereby incorporated by reference as though fully set forth herein.

Figure 3:
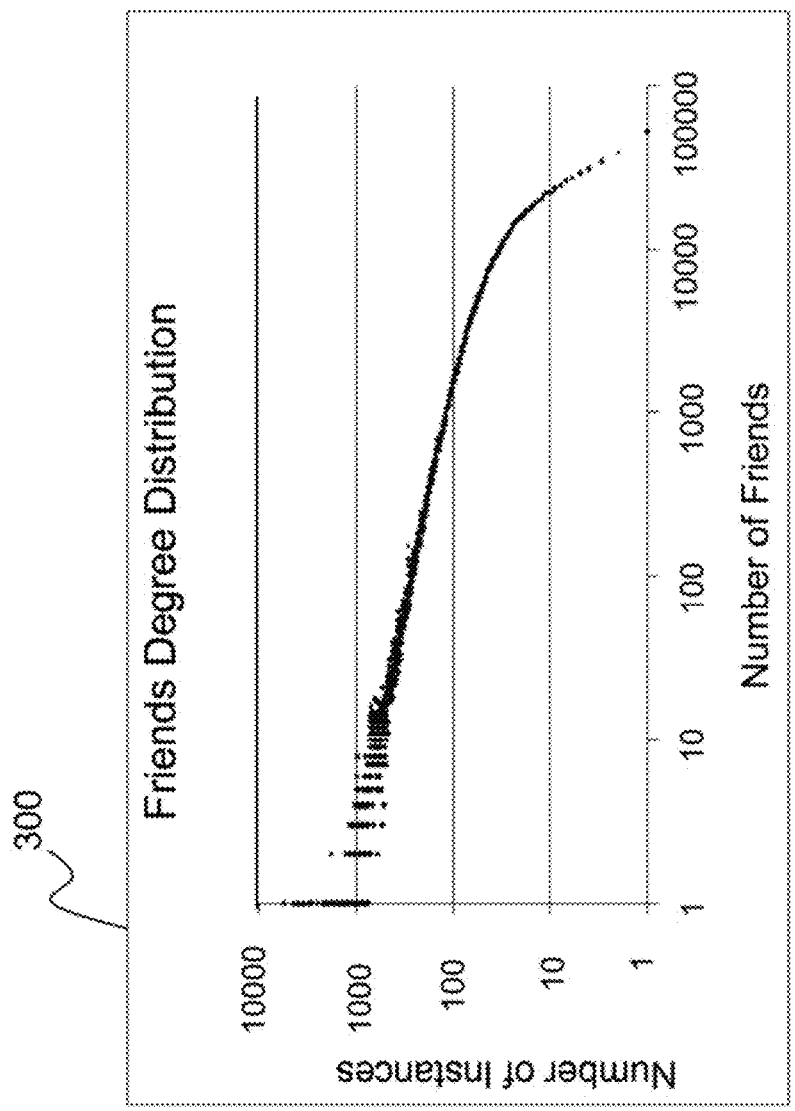
FIG. 3 is a graph depicting how many blogs have a given number of friends according to the present invention.

FIG. 3 is a graph 300 showing the degree distribution between blogs in the dataset. Along the x-axis is the number of friends a blog has, and along the y-axis is the number of instances of blogs with that many friends. It can be seen from the graph 300 that there are many people with very few friends and very few people with very many friends. This coincides with literature on other social datasets where they observe a power-law or exponential distribution.

Figure 4:
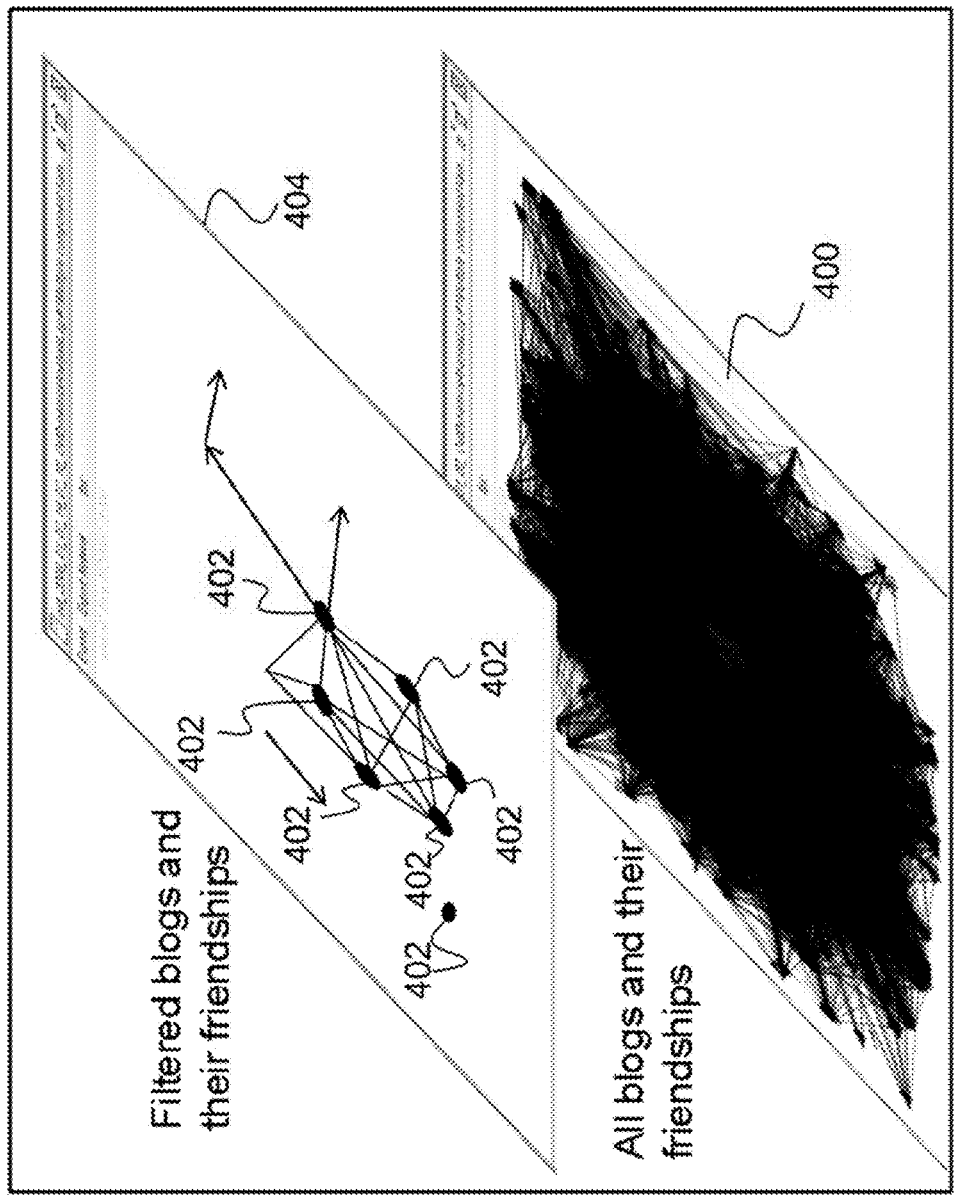
FIG. 4 is a set of plots illustrating how filtering data can allow clusters of important events to be more readily apparent according to the present invention.

The present system can also export dynamic data for visualization. FIG. 4 illustrates a static snapshot from a movie clip built using the SoNIA tool as described by Skye Bender-deMoll and McFarland, Daniel A. in "The Art and Science of Dynamic Network Visualization" in Journal of Social Structure, Volume 7, Number 2, 2006, which is hereby incorporated by reference as though fully set forth herein. The bottom plot 400 in FIG. 4 displays all users within two hops of a "Blog of Interest" and all of the relationships between them. Nodes 402 in FIG. 4 represent predefined EOIs, and the size of each node 402 depicts the severity of the event. For instance, if the event is adding a large number of new friends, the node 402 will grow larger with the number of new additions. In the bottom plot 400, there are a few events (nodes) at the center of the bottom plot 400; however, it is difficult to view anything, because the information gets lost in the deluge of data. The top plot 404 of FIG. 4 shows data which has been filtered to only show those users which have an EOI at some point in time (not necessarily coinciding together). In the top plot 404 (which represents a frame of the movie), it is apparent that there is a large group of EOIs (nodes 402) which are all connected. Filtering data can allow clusters of important events to be more readily apparent, where as in visualizations of the entire dataset (e.g., bottom plot 400), the important clusters may be obscured. As the movie plays, a user can see the relationships forming and leaving in a dynamic manner. This is a good example of possible group collusion, and the system flags this for further manual examination.

Figure 5:
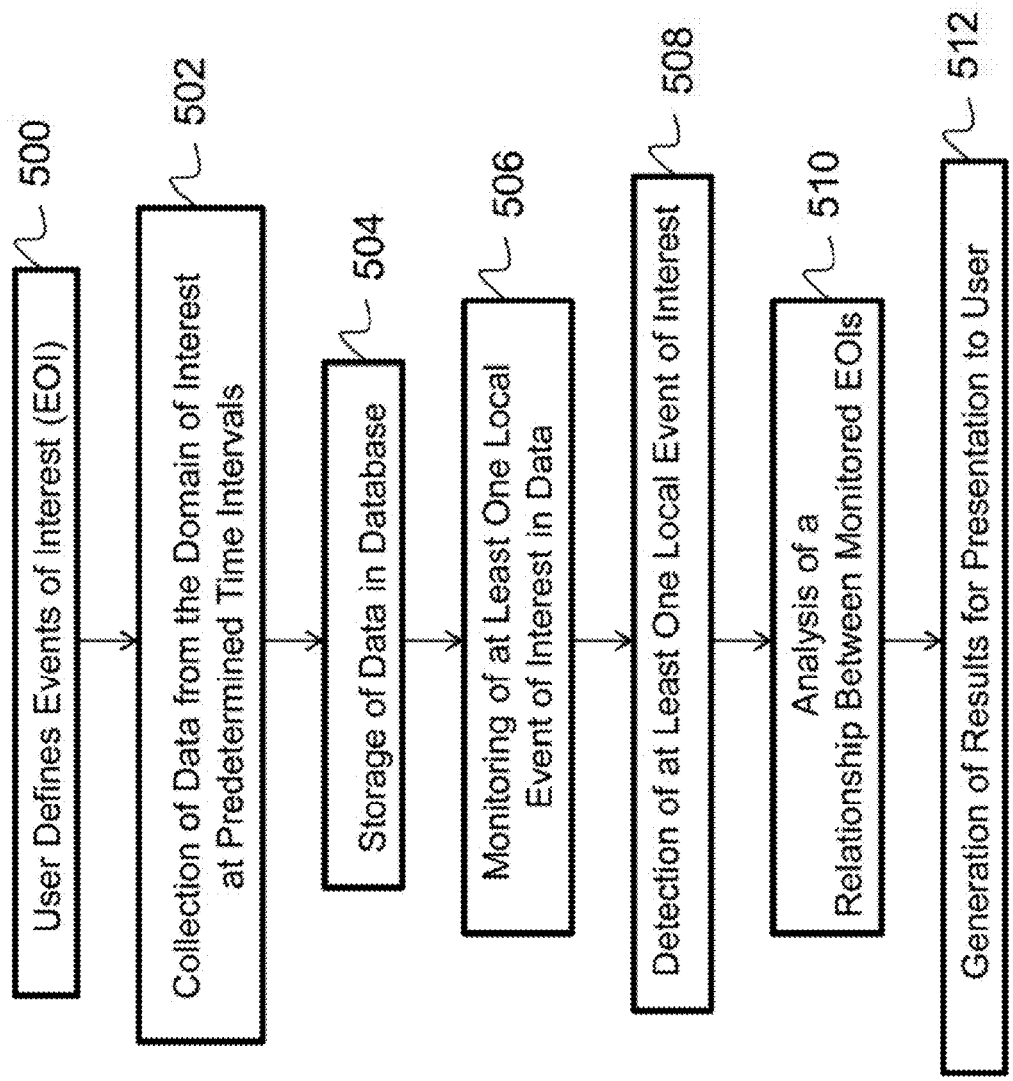
FIG. 5 is a flow diagram depicting the methodology of the analysis process according to the present invention.

FIG. 5 depicts the process described above as a flow chart. Initially, the analyst must understand the domain he or she is interested in analyzing and must determine what data is relevant and available. As described above, there are a variety of domains which can be modeled as dynamically evolving relational networks. Once the analyst has an idea of the types of group behaviors and patterns the analyst is interested in monitoring, the user defines EOIs 500. In most domains, the data is continuously changing. However, data can only be collected at specific time intervals, so the effect of temporal discretization needs to be taken into account. Once the EOIs are defined, the system begins collecting the data from the domain of interest and predetermined time intervals 502. The data is then stored in a database 504 (or other storage mechanism) for future access. Then, at least one user-defined EOI is monitored by the system 506. After detection of an EOI 508 through monitoring, a relationship between at least two monitored EOIs is analyzed 510 using an analysis engine. The analysis engine computes network properties of the relationship graph, such as node centrality, graph diameter, betweenness centrality, and degree distribution, which is further described in Chakrabarti et al. and Zhou et. al. The analysis results and relational network can then be presented to the user 512, exported for graph visualization, and/or sent as a notification (e.g., textual notification) to a system (or user of the system).

Figure 6:
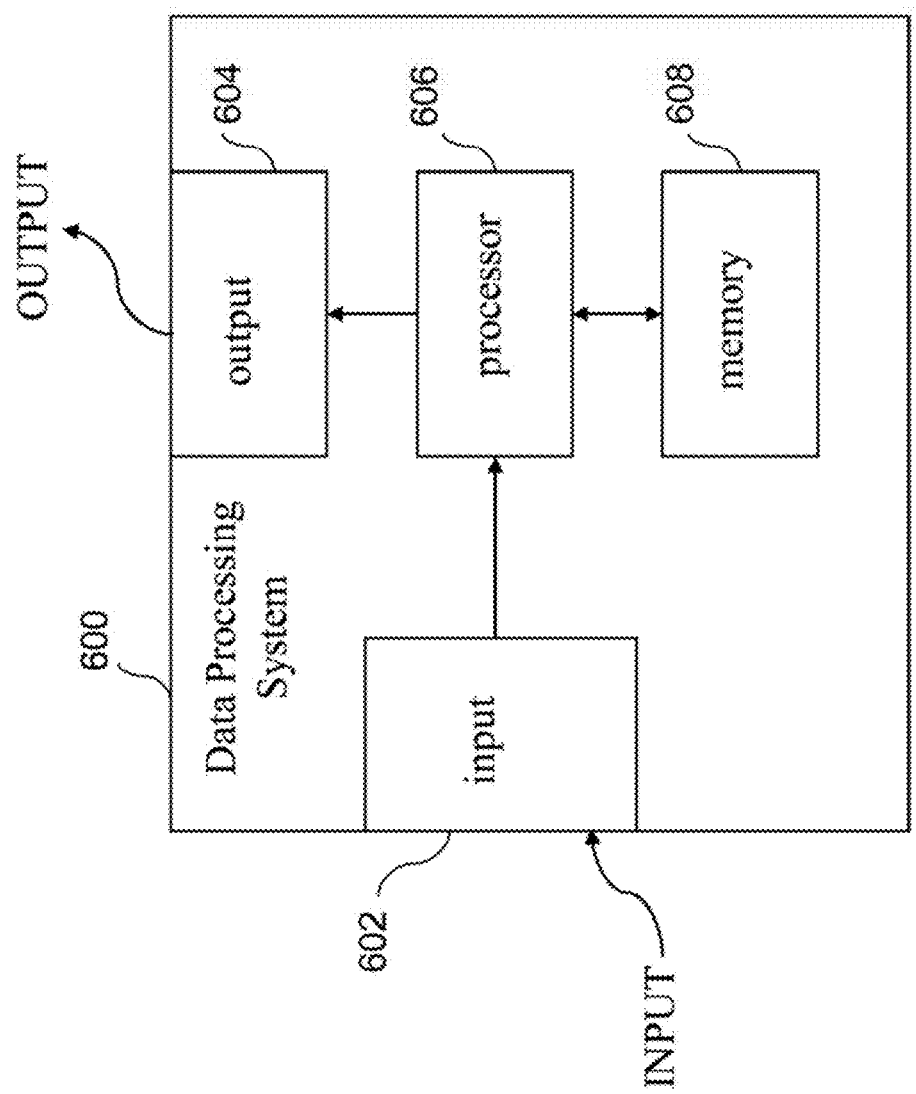
FIG. 6 is an illustration of a data processing system according to the present invention.

FIG. 6 illustrates a block diagram depicting components of a data processing system 600 (e.g., computer) incorporating the operations of the method described above. The method utilizes a data processing system 600 for storing computer executable instructions for causing a processor to carry out the operations of the above described method. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 (or processors) for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606.

Figure 7:
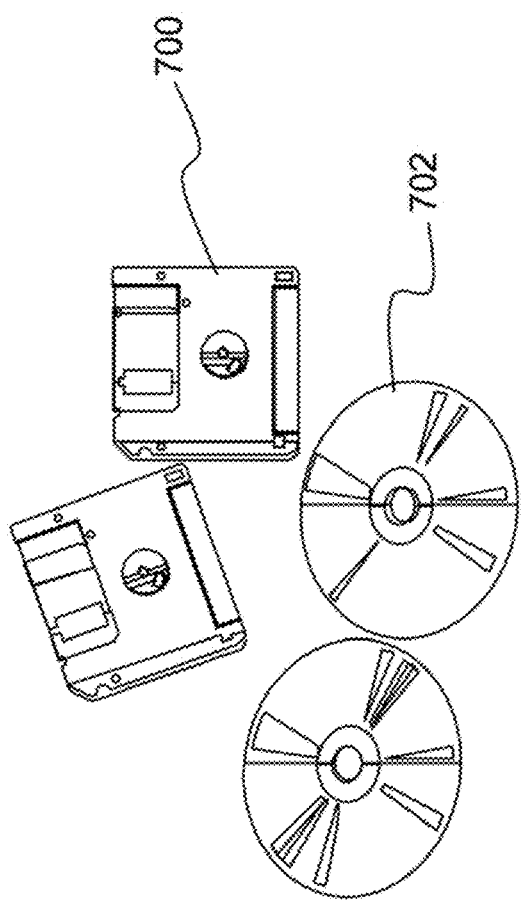
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code stored on any compatible computer readable medium.

What is claimed is:

1. A system for detecting group behaviors in data, the system comprising:
one or more processors and a memory having instructions such that when the instructions are executed, the one or more processors perform operations of:
downloading files from an Internet-based social network at predetermined time intervals and storing the downloaded files, wherein the downloaded files contain interactions between users of the Internet-based social network;
comparing each newly downloaded file with a set of previously downloaded files to detect changes in the downloaded files that represent changes in the relationships between users;
storing any detected changes in the downloaded files;
defining, by an analyst, at least one local event of interest to monitor in the downloaded files based on a group behavior of interest, wherein the at least one local event of interest is a detected change between an individual user of the Internet-based social network and the individual user's immediate relationships with a group of users on the Internet-based social network;
generating, with an analysis engine, visual results representing the relationship between the at least two monitored local events of interest across the group of users of the internet-based social network;
detecting and analyzing any group pattern between the at least two monitored local events of interest using the visual results; and
detecting any instance of group behavior between the at least two monitored local events of interest for presentation to the analyst.

2. The system for detecting group behaviors in data as set forth in claim 1, wherein the Internet-based social network is an Internet blog.

3. The system for detecting group behaviors in data as set forth in claim 2, wherein the system is further configured to perform operations of:
computing a set of properties of a relationship graph, comprising a plurality of nodes and edges, representing the relationship between the at least two monitored local events of interest; and
exporting the relationship graph for presentation to the analyst.

4. The system for detecting group behaviors in data as set forth in claim 2, wherein the system is further configured to perform an operation of exporting dynamic data for presentation to the analyst, wherein the dynamic data depicts relationships between monitored local events of interest forming and leaving in the social network.

5. The system for detecting group behaviors in data as set forth in claim 2, wherein the operation of monitoring of at least one local event of interest is performed in a distributed and parallel manner, such that a plurality of processors monitor the dataset simultaneously.

6. The system for detecting group behaviors in data as set forth in claim 2, wherein the system is further configured to perform an operation of calculating a change value within a set of data collected at different time intervals, such that the analyst can define a local event of interest based on the change value.

7. A computer-implemented method for detecting group behaviors in data, comprising an act of:
causing a data processor to execute instructions encoded on a memory such that upon execution, the data processor performs operations of:
downloading files from an Internet-based social network at predetermined time intervals and storing the downloaded files, wherein, the downloaded files contain interactions between users of the Internet-based social network;
comparing each newly downloaded file with a set of previously downloaded files to detect changes in the downloaded files that represent changes in the relationships between users;
storing any detected changes in the downloaded files;
defining, by an analyst, at least one local event of interest to monitor in the downloaded files based on a group behavior of interest, wherein the at least one local event of interest is a detected change between an individual user of the internet-based social network and the individual user's immediate relationships with a group of users on the Internet-based social network;
generating, with an analysis engine, visual results representing the relationship between the at least two monitored local events of interest across the group of users of the Internet-based social, network;

detecting and analyzing any group pattern between the at least two monitored local events of interest using the visual results; and detecting any instance of group behavior between the at least two monitored local events of interest for presentation to the analyst.

8. The method for detecting group behaviors in data as set forth in claim 7, wherein the social network is an Internet blog.

9. The method for detecting group behaviors in data as set forth in claim 8, further comprising acts of:

computing a set of properties of a relationship graph, comprising a plurality of nodes and edges, representing the relationship between the at least two monitored local events of interest; and exporting the relationship graph for presentation to the analyst.

10. The method for detecting group behaviors in data as set forth in claim 8, further comprising an act of exporting dynamic data for presentation to the analyst, wherein the dynamic data depicts relationships between monitored local events of interest forming and leaving in the social network.

11. The method for detecting group behaviors in data as set forth in claim 8, wherein the act of monitoring of at least one local event of interest is performed in a distributed and parallel manner, such that a plurality of processors monitor the dataset simultaneously.

12. The method for detecting group behaviors in data as set forth in claim 8, further comprising an act of calculating a change value within a set of data collected at different time intervals, such that the analyst can define a local event of interest based on the change value.

13. A computer program product for detecting group behaviors in data, the computer program product comprising computer-readable instruction means stored on a non-transitory computer-readable medium that are executable by a computer having a processor for causing the processor to perform operations of:

downloading files from an Internet-based social network at predetermined time intervals and storing the downloaded files, wherein the downloaded files contain interactions between users of the Internet-based social network;

comparing each newly downloaded file with a set of previously downloaded files to detect changes in the downloaded files that represent changes in the relationships between users;

storing any detected changes in the downloaded files;

defining, by an analyst, at least one local event of interest to monitor in the downloaded files based on a group behavior of interest, wherein the at least one local event of interest is a detected change between an individual user of the Internet-based social network and the individual user's immediate relationships with a group of users on the Internet-based social network;

generating, with an analysis engine, visual results representing the relationship between the at least two monitored local events of interest across the group of users of the Internet-based social network;

detecting and analyzing any group pattern between the at least two monitored local events of interest using the visual results; and detecting any instance of group behavior between the at least two monitored local events of interest for presentation to the analyst.

14. The computer program product for detecting group behaviors in data as set forth in claim 13, wherein the Internet-based social network is an Internet blog.

15. The computer program product for detecting group behaviors in data as set forth in claim 14, further comprising instruction means for causing the processor to perform operations of:

computing a set of properties of a relationship graph, comprising a plurality of nodes and edges, representing the relationship between the at least two monitored local events of interest; and exporting the relationship graph for presentation to the analyst.

16. The computer program product for detecting group behaviors in data as set forth in claim 14, further comprising instruction means for exporting dynamic data for presentation to the analyst, wherein the dynamic data depicts relationships between monitored local events of interest forming and leaving.

17. The computer program product for detecting group behaviors in data as set forth in claim 14, wherein the operation of monitoring of at least one local event of interest is performed in a distributed and parallel manner, such that a plurality of processors monitor the dataset simultaneously.

18. The computer program product for detecting group behaviors in data as set forth in claim 14, further comprising instructions means for calculating a change value within a set of data collected at different time intervals, such that the analyst can define a local event of interest based on the change value.

* * * * *